United States Patent [19]

Matsuoka et al.

[11] Patent Number: 4,478,432
[45] Date of Patent: Oct. 23, 1984

[54] LOCKING STRUCTURE FOR A SEAT BELT SLIDER IN A MOUNTING RAIL

[75] Inventors: Hideoki Matsuoka, Yokohama; Yoshimi Yamamoto, Shizuoka, both of Japan

[73] Assignee: Nissan Motor Company, Limited, Yokohama, Japan

[21] Appl. No.: 62,314

[22] Filed: Jul. 30, 1979

[30] Foreign Application Priority Data

Aug. 9, 1978 [JP] Japan .................................. 53-97588

[51] Int. Cl.³ ............................................ B60R 21/10
[52] U.S. Cl. ..................................................... 280/804
[58] Field of Search ............... 280/804, 803, 802, 808; 180/268; 297/469, 473, 479, 483

[56] References Cited

U.S. PATENT DOCUMENTS

| | | | |
|---|---|---|---|
| 3,842,929 | 10/1974 | Wada et al. | 280/804 |
| 3,900,078 | 8/1975 | Otani | 280/804 |
| 3,927,902 | 12/1975 | Lindblad | 280/804 |
| 3,971,570 | 7/1976 | Nilsson et al. | 280/804 |
| 4,061,365 | 12/1977 | Nagano et al. | 280/804 |

FOREIGN PATENT DOCUMENTS

2440990 11/1976 Fed. Rep. of Germany .

Primary Examiner—Robert R. Song
Attorney, Agent, or Firm—Lane, Aitken & Kananen

[57] ABSTRACT

In a passive restraint seat belt structure wherein a seat belt end is fixed to a slider which is movable along a mounting rail, and which is to be fixed to the rear end of the rail when the door of the vehicle is closed, a locking device for fixing the slider is disclosed. The slider is driven by a driver member which is loosely connected to the slider with a certain amount of free play therebetween. When the slider is driven backwards, the driver member is in a first position relative to the slider which allows engagement between an engagement assembly on the slider and an engagement assembly fixed on the body of the vehicle. When the slider is to be moved forward, driver member is first moved forward, and it assumes a second position relative to the slider, wherein a catch-releasing portion on the driver member breaks the engagement of the two engagement assemblies, thus releasing the slider member from its locked engagement in its rearmost position on the rail, and allowing the slider member to be driven forward.

3 Claims, 7 Drawing Figures

LOCKING STRUCTURE FOR A SEAT BELT SLIDER IN A MOUNTING RAIL

BACKGROUND OF THE INVENTION

The present invention relates to an anchoring device for passive seat belts.

Nowadays it is compulsory for passenger automobiles to be fitted with seat belts; however, often passengers neglect to fasten the belts. Therefore, it is contemplated to make the fitting of so-called passive passenger restraint systems compulsory. One such system is a passive seat belt system in which the seat belts are automatically fitted onto the passengers as they sit in the automobile and are automatically locked on them.

In the majority of such passive seat belt systems, one anchoring point of the belts is above the vehicle door, on a slide rail just above the door edge, and the belt is attached to a slide member that moves along the rail in accordance with the opening and shutting of the door, so that the slide member moves forward when the door is opened, and backward when it is closed, so as to tighten the seat belt automatically on the passenger.

In such a structure, it is necessary to provide some sort of locking device to lock the slide member to the vehicle when the vehicle door is closed and the vehicle is being driven, in order to provide positive safety for the seat belt system. Heretofore, such locking has been done electrically, by a solenoid which is activated by the movement of the door, or by the operation of a drive motor which moves the slide member along the rail. Such a system, however, requires both electric components and mechanical components to perform the locking. Hence it is expensive and has reliability problems.

SUMMARY OF THE INVENTION

Therefore, it is an object of the present invention to eliminate these drawbacks by providing an anchoring device for a passive seat belt rail slider member which is purely mechanical, without electric components, which is rugged, cheap to manufacture, requires little servicing, and is reliable.

According to the present invention, this and other objects are accomplished by the present invention wherein a vehicle is equipped with a passive seat belt system which comprises a mounting rail fixed along the longitudinal direction of the vehicle above a door of the vehicle, a slider slidably fitted in the mounting rail, a seat belt, one end of which is fixed to the slider, and a motor which is controlled according to the opening and shutting of the vehicle door. A locking device is provided which locks the slider in its rearmost position on the mounting rail, comprising: a first engagement assembly which is attached to the slider; a second engagement assembly fixed with respect to the body of the vehicle; and a driver member which connects the motor to the slider and transmits force from the motor to propel the slider to and fro along the rail. The end portion of the driver member comprises a catch-releasing portion, loosely connected to the slider with a certain relatively small amount of movement allowed therebetween. When the motor is activated so as to move the slider by the driver member to its rearmost position along the rail, the first engagement assembly and the second engagement assembly engage together so as to lock the slider in this position on the rail, the driver member assumes a first position with respect to the slider and the body engagement assembly which permits this engagement. When the motor is activated, with the members in the position, in the direction to move the slider forward along the rail, the driver member moves to a second position relative to the slider wherein the catch-releasing portion of the driver member breaks the engagement of the first and the second engagement assemblies. The slider is thereby released from its locked engagement in the rearmost position on the rail and is allowed to be moved forward along the rail by the driver member.

By this construction, when the door is fully closed and the slider is moved to its rearmost position along the rail, the slider is automatically and positively locked in this position by the engagement of the first and the second engagement assemblies. The engagement assemblies are allowed to engage because, as the driver member has driven the slider backward along the rail, the driver member has automatically assumed the first position with respect to the slider, which permits this engagement. However, when the door is opened, and the motor activates the driver member so as to move the slider forward, when the motor has operated for a certain time, so as to move the driver member from the first to the second position with respect to the slider, the catch-releasing portion on the driver member triggers the disengagement of the first and the second engagement assemblies, so as to release the locking of the slider. Thus, there is a certain amount of slack in this release operation; that is, the driver member must be moved for a certain distance relative to the slider, before the locking is released. This provides a good degree of safety in the operation of the seat belt; if the door is only partially opened, the slider engagement is not released.

According to various possible particular forms of the present invention, the first and second engagement assemblies can be each either a locking plate or a catch, the other being either a catch or a locking plate, respectively. Alternatively, one of the first and second engagement assemblies can be a plate with a hole through it, and the other can be a latch which engages with this hole. Another additional possibility is that one of the engagement assemblies can be a plate with an arrowhead-shape on its end, and the other can be a double latch which snaps together on this arrowhead shape.

BRIEF DESCRIPTION OF THE DRAWINGS

The present invention will become more fully and clearly understood upon perusal of the following description of several preferred embodiments thereof, and in conjunction with the accompanying drawings. It should be clearly understood, however, that the descriptions of the embodiments, and the drawings, are given purely for the sake of explanation and elucidation only, and are not intended to limit the scope of the present invention, or the protection and monopoly sought to be afforded by Letters Patent, in any way; these are intended to be defined solely by the accompanying claima.

In the drawings.

DESCRIPTION OF THE PREFERRED EMBODIMENTS

Figure 1:
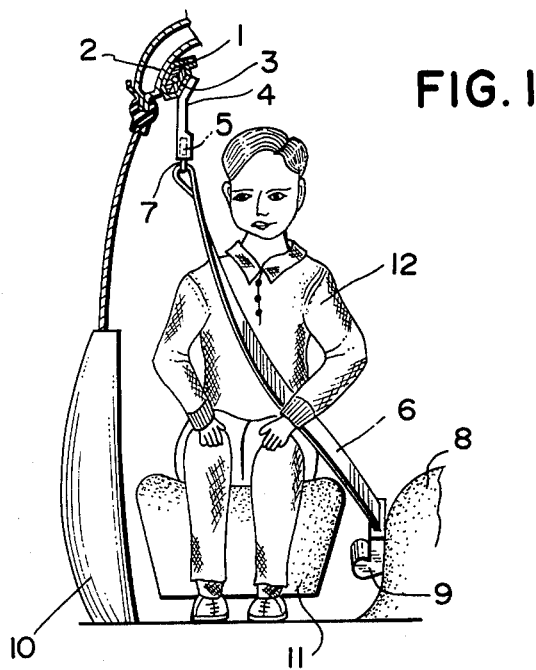
FIG. 1 is a front view of a person held in his seat by a seat belt, for the explanation of the general layout of a passive seat belt system according to a preferred embodiment of the present invention.
Figure 2:
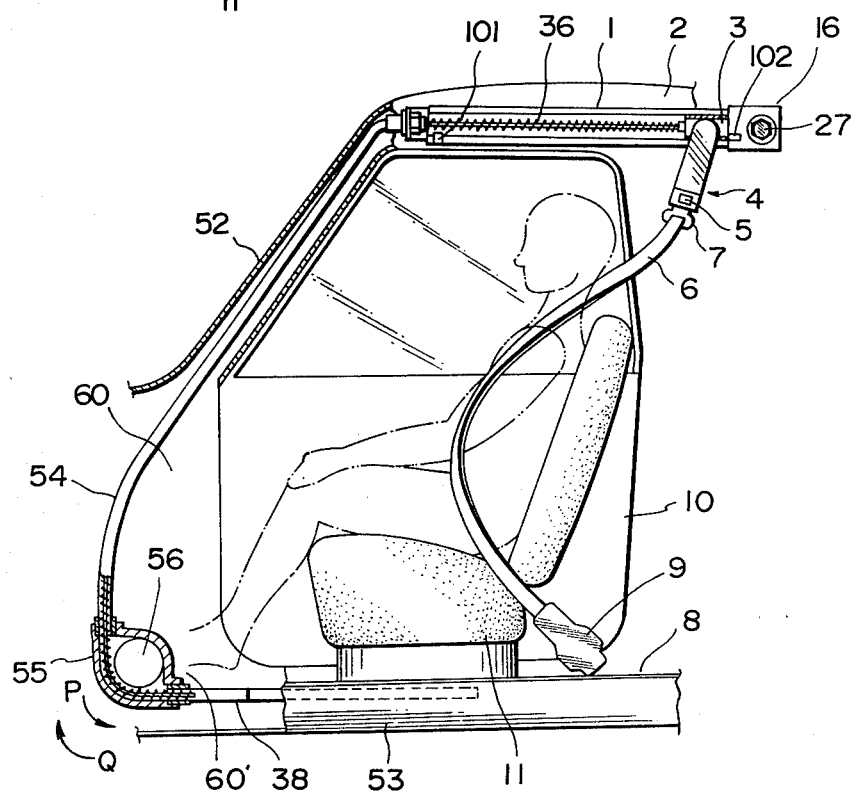
FIG. 2 is a side view of the person in FIG. 1 as seated in his seat and restrained by the belt, which is in the attached position, with a slider member at the rear end of its rail.

FIGS. 1 and 2 are general views showing the layout of a passive seat belt system. Reference numeral 1 denotes a guide rail or mounting rail, which is fixed along the longitudinal direction of the vehicle above a door of the vehicle. Slidably fitted on the guide rail 1 is a slider 3, to which one end of an anchor 4 is attached. The other end of the anchor 4 is connected to a tongue 7 fixed on the end of a seat belt webbing 6 via an emergency release buckle 5. The other end of the webbing 6 is coiled into a retractor 9 on a floor 8 at the middle of the vehicle, in this embodiment; however, this could be varied, in different embodiments.

The slider 3 slides on the mounting rail 1, and is propelled to and fro along the mounting rail 1 in response to the opening and the closing of the vehicle door by a motor, which is not shown, which turns a sprocket 56, which drives a push-pull wire 36 to and fro, as indicated by the arrows P and Q in the diagram of FIG. 2. The push-pull wire 36 is connected to the slider 3 by a structure which will be shown hereinafter. The push-pull wire 36 is mounted in a tube 54 which is installed in a front pillar 52 of the vehicle, and in a tube 38 installed in the side of the floor of the vehicle. The sprocket 56 in installed in a corner 60' of the body of the vehicle.

Figure 3:
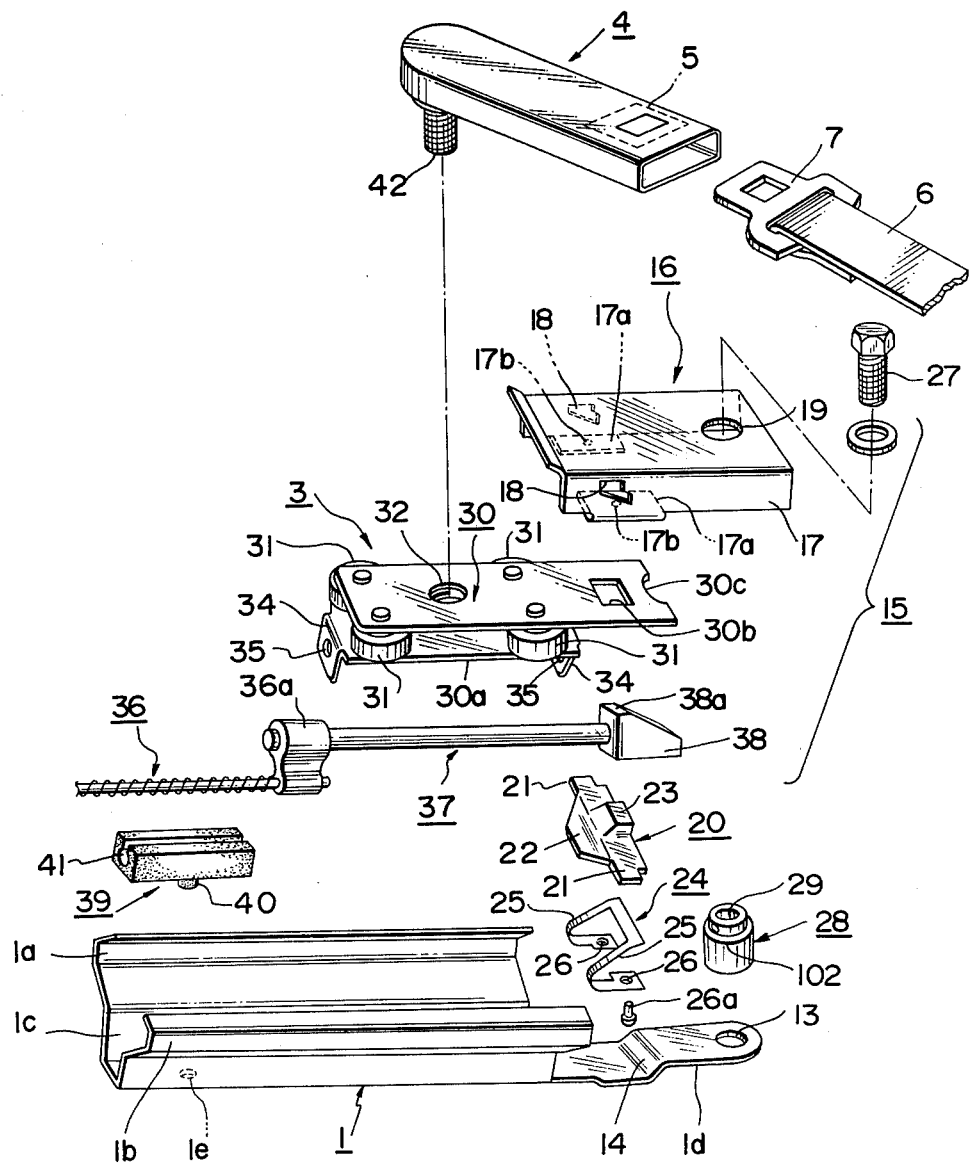
FIG. 3 is an exploded view of a locking device according to the present invention.

FIG. 3 shows the details of the connection of the push-pull wire 36 to the slider 3, and shows an anchoring device for the slider 3 which fixes the slider 3 in its rearmost position of the rail 1, according to the present invention.

The mounting rail 1 is formed with bent portions 1a and 1b at its sides for holding the slider. At the end of the rail, integrally formed, is a protruding piece 1d with a rising step 14 formed therein. On the end of the piece 1d, a buckle 15 is mounted by a hole 19 by a bolt and washer 27 which passes through a hole 13, and through a hole 29 of a spacer 28.

A housing 16 of the buckle 15 is channel-shaped and has two side plates 17, each of which has a hole 18 shaped as shown in the figure. Below the hole 18 in each side plate, an inwardly bent portion 17a is formed. The reference numeral 17b denotes a hole formed in each portion 17a. A latch 20 formed as shown in the drawing has projections 21 on its sides which fit into the supporting holes 18, and its front edge is provided with a tongue 22 and its upper rear surface is provided with a projection 23. A ramp-like portion leads up from the tongue 22 to the projection 23. The latch 20 is oscillatably supported as a whole by the projections 21 fitted into the holes 18, as aforesaid, and is biased by a spring 24 which has two side spring pieces 25, of the shown shape, which are fixed to the holes 17b on the inwardly bent portions 17a by rivets 26a.

Thus, this buckle 15 may be considered as an engagement assembly which is fixed to the body of the vehicle.

Now the slider 3 will be described. The body of the slider 3 is composed of an upper plate 30 and a lower plate 30a, between which are mounted four rollers 31, which ride in the bent portions 1a and 1b of the mounting rail 1 and carry the slider 3. The upper plate 30 is formed with a hole 32 to which is rotatably attached the anchor 4 to which the seat belt is attached, as explained above. On the rear end of the upper plate 30 is an arc-shaped notch 30c adapted to contact with the spacer 28 and stop the rearward movement of the slider 3. Further, the rear end of the upper plate 30 is formed with a hole 30b adapted to receive the projection 23 of the latch 20.

The lower plate 30a is formed at its front and rear ends with downwardly bent portions 34, which are pierced with holes 35. Reference numeral 36 denotes the aforementioned push-pull wire, which is formed of geared wire, which is a bundle of many strands of steel wire spirally wound together by another wire. On the end of this push-pull wire 36 is fixed a connecting piece 36a which also serves as a stopper piece. A cam rod 37 extends rearward from this connecting piece 36a and passes through the holes 35 and thereby mounts the push-pull wire to the slider 3 with a certain relatively small amount of free play therebetween. On the rear end of the cam rod 37 is fixed a wedge-shaped cam 38. As is seen in the diagram, the length of the free portion of the cam rod 37 is a little longer than the distance between the portions 34. The cam 38, as will be seen hereinafter, is for releasing the latch 20.

Reference numeral 39 denotes a guide block which is mounted in the mounting rail 1 and has a mounting projection 40 and a groove 41 which allows the connecting piece 36a to pass through it. Further, reference numerals 102 and 101 depict limit switches 101 and 102 prevent respectively excess backward and forward movement of the slider 3.

Figure 4:
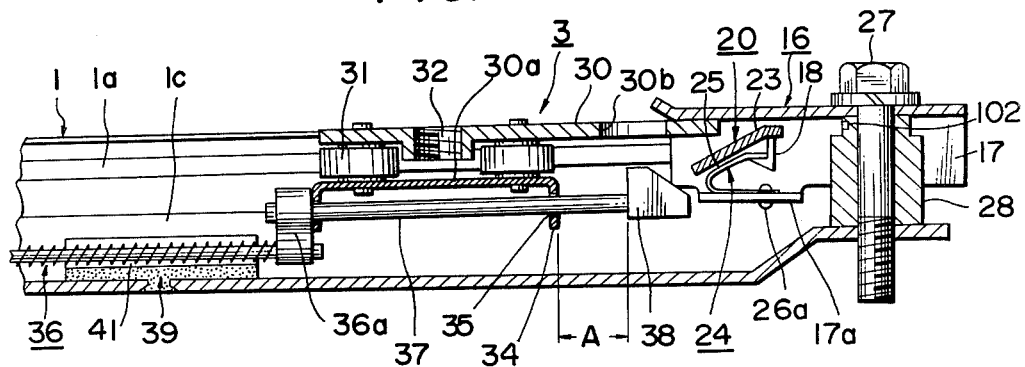
FIG. 4 is a side view of the device of FIG. 3, showing the position before it is locked.
Figure 5:
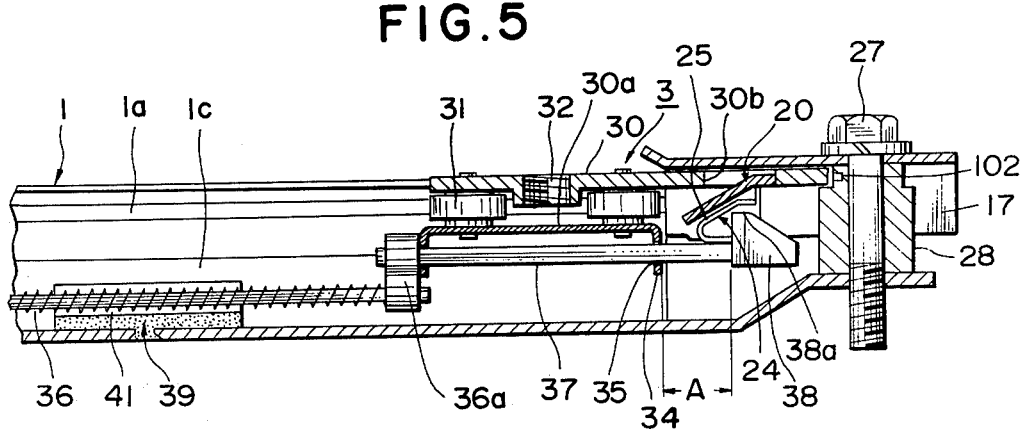
FIG. 5 is a view similar to FIG. 4, showing the position after the device is locked.

The locking device described above operates as follows. First, when a passenger sits on a seat 11 and closes a door 10, with the slider 3 in the forward position, the motor is actuated in a per se well known fashion to move the sprocket 56 clockwise as seen in FIG. 2, which moves the push-pull wire 36 is the direction of the arrow Q. Thus the slider 3 is moved backward in the mounting guide rail 1 toward the rear of the vehicle, being pushed by the connecting piece 36a bearing against the left hand portion 34 in FIG. 3, with the cam rod 37 in its right hand position relative to the slider 3. Thus movement continues until the condition illustrated in FIG. 4 has been brought about, wherein the cam 38 is just about to pass underneath the latch 20, and furthermore the rear end portion of the upper plate 30 is just about to engage with the upper surface of the latch 20. Next, the mechanism moves to the position shown in FIG. 5, wherein the cam 38 has entered between the side members 25 of the spring 24, between the portions 17a, and has passed under the latch 20, and also the upper projection 23 of the latch 20 has engaged with the hole 30b of the upper plate 30, into which it is biased by the spring 24. Thus, in this position, the right hand edge as seen in the figures of the projection 23 engages with the right hand edge of the hole 30b to positively lock the slider from moving forward again along the rail. At this position, the limit switch 102 cuts off power to the motor and the guide block 39 comes to a standstill. At just this position the arc-shaped notch 30c on the end of the upper plate 30 has fitted with the circumference of the spacer 28, so that backlash is prevented. In this position the belt is locked on the rail, and the slider cannot be moved forward even by the exertion of considerable force, such as is present in a crash or in sudden deceleration of the vehicle.

Now, when the passenger opens the door to get out of the car, the motor operates to rotate the sprocket 56 counterclockwise in the figure, so that the push-pull wire 36 is moved in the direction P. Thus, referring to FIG. 5, the first thing that happens is that the members 36, 36a, 37, and 38 are moved to the left. During this movement, of course the slider 3 does not move, because it is locked in place, as explained above. Then, however, the upper left corner as seen in the figure of the cam 38 engages with the latch 20, pushing the tongue 22 upwards and rotating the latch as a whole around the axis of the projections 23 clockwise. Thereby the projection 23 is released from the opening 30b, and the slider is freed so that it may be moved forward. The cam 38 then comes into contact with the right hand portion 34, and, thereafter, the push-pull wire 36 draws the slider forward along the mounting rail. The passenger is thereby released from his seat belt. When the slider reaches its frontmost position it contacts the limit switch 101 and the motor is stopped.

It is thus seen that when the motor is activated in the direction to move the slider forward along the rail, the cam 38 breaks the engagement of the buckle 15 and the hole in the upper plate 30, so that the slider is released from its locked engagement on the rail and is allowed to be moved forwards along the rail by the push-pull wire 36.

Figure 6:
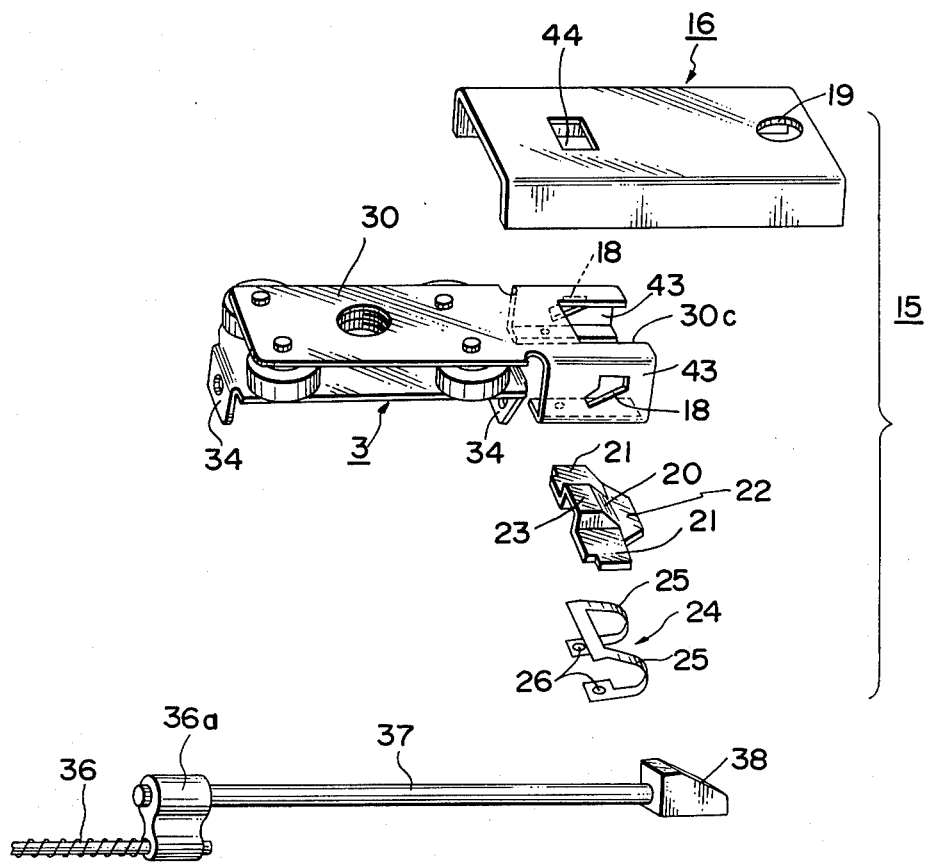
FIGS. 6 and 7 are exploded views similar to FIG. 3, showing two other embodiments of the present invention.

FIG. 6 shows another embodiment of the present invention. In this embodiment, the buckle is mounted on the slider and the locking plate with a hole 16 is stationary. Similar parts in FIG. 6 are designated by the same reference numerals as in FIG. 3. On the upper plate 30, the buckle 15 is formed as an extension of the plate 30 with portions 43 which are bent down along its sides and folded underneath. Supporting holes 18 formed on the portions 43 support the projections 21 of the latch 20. In this embodiment, however, the shape of the holes needs to be somewhat different, and the latch is mounted in the reverse orientation from that of the latch of the embodiment of FIGS. 3-5. A hole 44, formed in the fixed plate 16, is adapted to engage with the projection 23 of the latch 20.

Also with this embodiment, when the slider is moved rearward by the push-pull wire 36, the latch 20 engages with the hole 44 and locks the slider, with the cam 38 in its rearmost position relative to the slider; but when the slider is to be moved forwards, the pulling of the push-pull wire 36 first moves the cam rod 37, cam 38, and so forth, to the left in the figure, so that the upper left part of the cam 38 engages with the latch 20, turning it counterclockwise in the figure and releasing it. It is to be noted that in this embodiment this upper left part of the cam 38 has to be slightly cut away; the portion of the cam 38 which was present in the first embodiment, and is to be cut away in this embodiment, is shown by a phantom line.

It will be readily appreciated that the same functions are available with this structure as with the previously explained one.

Figure 7:
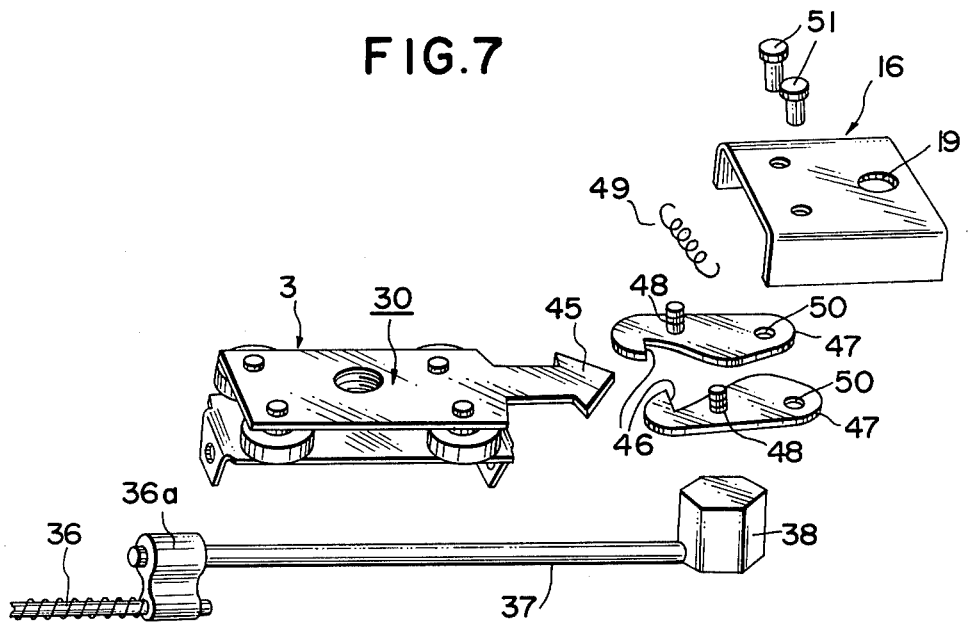

FIG. 7 shows a third embodiment of the present invention. Here, the rear end of the upper plate 30 is formed as an arrowhead-like projection 45, and instead of the single latch used in the previous embodiments a double latch is used, formed of a pair of latch levers 47, each of which is formed with a hook 46 adapted to engage with the projection 45. The latch levers 47 are biased together by a spring 49 fitted between projections 48 on top of the levers, and are pivoted on the housing 16 by rivets 51. The cam 38 has an elongated hexagonal cross-section which fits neatly between the latch levers 47.

This embodiment works in a similar fashion to the those previously described. When the slider is moved to the right (i.e., to the rear of the vehicle) the latch levers 47 lock together on the projection 45. The latch levers 47 are released when the cam 38 moves to the left relative to the slider, as the motor is first operated to pull the slider, and pushed the latch levers apart. It is to be noticed that, as the slider is first engaged with the latch levers 47, moving to the right, the cam 38 holds the latch levers 47 apart and facilitates their engagement on the projection 45. Thereafter, the cam 38 moves to the right of the latch levers 47, allowing them to close on the projection 45.

According to the present invention, therefore, a safe and simple positive seat belt slider locking device is provided. Further, the movement through the distance A, as shown in the figures of the push-pull wire 36, does not disturb the locking of the slider, so that this slider does not immediately respond if the door is slightly opened. This is a useful safety feature.

Although the present invention has been shown and described in terms of several preferred embodiments thereof, it should be understood that various changes and omissions of the form and content of any particular embodiment may be made by one skilled in the art, without departing from the scope of the present invention. Therefore it is expressly desired that the scope and the limits of the present invention, and of the monopoly sought to be granted, should be defined, not by any details of the embodiments described, or of the drawings, but solely by the accompanying claims, which follow.

What is claimed is:

1. In a vehicle which is equipped with a passive seat belt system which comprises a mounting rail fixed along the longitudinal direction of the vehicle, a slider which is fitted slidably in the mounting rail, a seat belt one end of which is fixed to the slider, and a motor which is controlled according to the opening and shutting of the vehicle door, a locking device which locks the slider in its rearmost position on the mounting rail, comprising:

a first engagement assembly which is attached to the slider;

a second engagement assembly fixed with respect to the body of the vehicle;

and a driver member which connects the motor to the slider and transmits force from the motor to propel the slider to and fro along the rail, and whose end portion, comprising a catch-releasing portion, is loosely connected to the slider with a certain relatively small amount of movement allowed therebetween;

whereby, when the motor is activated so as to move the slider by the driver member to its rearmost position along the rail, the first engagement assembly and the second engagement assembly engage together so as to lock the slider in this position on the rail, the driver member assuming a first position with respect to the slider and the body engagement assembly which permits this engagement; and, when the motor is activated, with the members in this position, in the direction to move the slider forward along the rail, the driver member moves to a second position relative to the slider wherein the catch-releasing portion of the driver member breaks the engagement of the first and second engagement assemblies, so that the slider is released from its locked engagement in the rearmost position on the rail and is allowed to be moved forward along the rail by the driver member, wherein the first engagement assembly is a catch, and the second engagement assembly is a locking plate, and wherein the locking plate is a plate with a hole through it, and the catch comprises a latch member, part of the latch member protruding through the hole when the locking device is engaged, and wherein the catch-releasing position nudges the latch member to release it from the hole, when the driver member is moved from the first to the second position with the locking device engaged.

2. In a vehicle which is equipped with a passive seat belt system which comprises a mounting rail fixed along the longitudinal direction of the vehicle, a slider which is fitted slidably in the mounting rail, a seat belt one end of which is fixed to the slider, and a motor which is controlled according to the opening and shutting of the vehicle door,
  a locking device which locks the slider in its rearmost position on the mounting rail, comprising:
  a first engagement assembly which is attached to the slider;
  a second engagement assembly fixed with respect to the body of the vehicle;
  and a driver member which connects the motor to the slider and transmits force from the motor to propel the slider to and fro along the rail, and whose end portion, comprising a catch-releasing portion, is loosely connected to the slider with a certain relatively small amount of movement allowed therebetween;
  whereby, when the motor is activated so as to move the slider by the driver member to its rearmost position along the rail, the first engagement assembly and the second engagement assembly engage together so as to lock the slider in this position on the rail, the driver member assuming a first position with respect to the slider and the body engagement assembly which permits this engagement; and, when the motor is activated, with the members in this position, in the direction to move the slider forward along the rail, the driver member moves to a second position relative to the slider wherein the catch-releasing portion of the driver member breaks the engagement of the first and second engagement assemblies, so that the slider is released from its locked engagement in the rearmost position on the rail and is allowed to be moved forward along the rail by the driver member, wherein the first engagement assembly is a locking plate and the second engagement assembly is a catch and wherein the locking plate is a plate with a hole through it, and the catch comprises a latch member, part of the latch member protruding through the hole when the locking device is engaged, and wherein the catch-releasing position nudges the latch member to release it from the hole, when the driver member is moved from the first to the second position with the locking device engaged.

3. A locking device as in claim 2, wherein the locking plate is a plate with an arrowhead-shape at its end, and the catch comprises two latch members, which snap together on the arrowhead-shape and hold it when the locking device is engaged, and wherein the catch-releasing portion nudges the two latch members apart to release them from the arrowhead-shape, when the driver member is moved from the first to the second position with the locking device engaged.

* * * * *